United States Patent
Davidson et al.

(10) Patent No.: US 12,117,983 B2
(45) Date of Patent: Oct. 15, 2024

(54) MODEL ML REGISTRY AND MODEL SERVING

(71) Applicant: Databricks, Inc., San Francisco, CA (US)

(72) Inventors: Aaron Daniel Davidson, Berkeley, CA (US); Clemens Mewald, Lafayette, CA (US); Tomas Nykodym, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/512,028

(22) Filed: Nov. 17, 2023

(65) Prior Publication Data

US 2024/0152496 A1 May 9, 2024

Related U.S. Application Data

(63) Continuation of application No. 18/162,579, filed on Jan. 31, 2023, now Pat. No. 11,853,277, which is a continuation of application No. 17/324,907, filed on May 19, 2021, now Pat. No. 11,693,837.

(60) Provisional application No. 63/080,569, filed on Sep. 18, 2020.

(51) Int. Cl.
*G06F 16/00* (2019.01)
*G06F 16/21* (2019.01)
*G06F 16/955* (2019.01)
*G06N 5/022* (2023.01)

(52) U.S. Cl.
CPC .......... *G06F 16/219* (2019.01); *G06F 16/955* (2019.01); *G06N 5/022* (2013.01)

(58) Field of Classification Search
CPC .............................. G06F 16/219; G06F 16/955
See application file for complete search history.

(56) References Cited

U.S. PATENT DOCUMENTS

| | | | |
|---|---|---|---|
| 6,212,560 B1 | 4/2001 | Fairchild | |
| 7,506,334 B2 * | 3/2009 | Curtis | G06F 9/541 |
| | | | 717/170 |
| 7,698,398 B1 | 4/2010 | Lai | |
| 8,069,435 B1 | 11/2011 | Lai | |
| 8,346,929 B1 | 1/2013 | Lai | |
| 9,516,053 B1 * | 12/2016 | Muddu | G06F 16/9024 |
| 9,723,110 B2 | 8/2017 | Yang et al. | |
| 10,270,886 B1 | 4/2019 | Postelnik et al. | |
| 10,380,500 B2 | 8/2019 | Miao et al. | |
| 10,482,069 B1 | 11/2019 | Barnes et al. | |
| 10,880,347 B1 | 12/2020 | Krishnan et al. | |

(Continued)

OTHER PUBLICATIONS

United States Office Action, U.S. Appl. No. 17/324,907, Dec. 7, 2022, 9 pages.

*Primary Examiner* — Noosha Arjomandi
(74) *Attorney, Agent, or Firm* — Fenwick & West LLP

(57) ABSTRACT

A system includes an interface, a processor, and a memory. The interface is configured to receive a version of a model from a model registry. The processor is configured to store the version of the model, start a process running the version of the model, and update a proxy with version information associated with the version of the model, wherein the updated proxy indicates to redirect an indication to invoke the version of the model to the process. The memory is coupled to the processor and configured to provide the processor with instructions.

20 Claims, 9 Drawing Sheets

(56) References Cited

U.S. PATENT DOCUMENTS

| | | |
|---|---|---|
| 11,468,369 B1 | 10/2022 | Wilson et al. |
| 11,562,180 B2* | 1/2023 | Nushi ................... G06N 5/045 |
| 11,681,819 B1* | 6/2023 | Surazski ............ G06F 16/9535 |
| | | 726/28 |
| 2011/0153957 A1 | 6/2011 | Gao et al. |
| 2011/0283256 A1 | 11/2011 | Raundahl Gregersen et al. |
| 2015/0019825 A1 | 1/2015 | Gao et al. |
| 2015/0213134 A1 | 7/2015 | Nie et al. |
| 2017/0091651 A1 | 3/2017 | Miao et al. |
| 2019/0250898 A1 | 8/2019 | Yang |
| 2019/0384640 A1* | 12/2019 | Swamy ................... G06F 9/453 |
| 2020/0134484 A1* | 4/2020 | Hazard .................. G06N 5/025 |
| 2020/0177960 A1* | 6/2020 | Rakshit ............... H04N 21/858 |
| 2020/0401696 A1* | 12/2020 | Ringlein ............... G06F 21/552 |
| 2021/0097125 A1* | 4/2021 | Khanna ................... H04L 67/02 |
| 2021/0174253 A1 | 6/2021 | Moore et al. |
| 2021/0263978 A1* | 8/2021 | Banipal ................. G06N 20/00 |
| 2021/0264321 A1 | 8/2021 | Xiang |
| 2022/0014963 A1* | 1/2022 | Yeh ......................... G06N 7/01 |
| 2022/0092043 A1 | 3/2022 | Davidson et al. |
| 2022/0263843 A1* | 8/2022 | Aslam ..................... G06F 30/20 |
| 2022/0303680 A1* | 9/2022 | Ahmed ................. H04W 76/14 |
| 2022/0414455 A1 | 12/2022 | Collins et al. |
| 2023/0136939 A1* | 5/2023 | Kanzelberger ......... G06N 5/041 |
| | | 706/47 |
| 2023/0177031 A1* | 6/2023 | Davidson ............... G06N 20/00 |
| | | 707/695 |

* cited by examiner

MODEL ML REGISTRY AND MODEL SERVING

CROSS-REFERENCE TO RELATED APPLICATIONS

This application is a continuation application of U.S. patent application Ser. No. 18/162,579, filed Jan. 31, 2023, which is a continuation application of U.S. patent application Ser. No. 17/324,907, filed May 19, 2021, now U.S. Pat. No. 11,693,837, which claims priority to U.S. Provisional Patent Application No. 63/080,569, filed Sep. 18, 2020, all of which are incorporated herein by reference for all purposes in their entirety.

FIELD OF THE INVENTION

This disclosure relates generally to artificial reality systems, and more specifically to updating audio presented to a user by an artificial reality system based on biometric data captured for the user of the artificial reality system.

BACKGROUND

A business utilizing machine learning models for decision making typically stores multiple versions of multiple models. As models are updated with new data or new techniques, the new versions are stored. One or more of the versions are utilized at any given time. Typically the model is accessed using a universal resource locator (e.g., URL) application programming interface (e.g., API) endpoint including a model server, model name, and version number. Adding a new version requires manually creating a new model service with a new endpoint URL and configuring requesting services to access the new model service at the new endpoint. This creates a problem wherein a substantial amount of manual maintenance is required for model updating, increasing the chances of introducing errors in the process.

BRIEF DESCRIPTION OF THE DRAWINGS

Various embodiments of the invention are disclosed in the following detailed description and the accompanying drawings.

DETAILED DESCRIPTION

Figure 1:
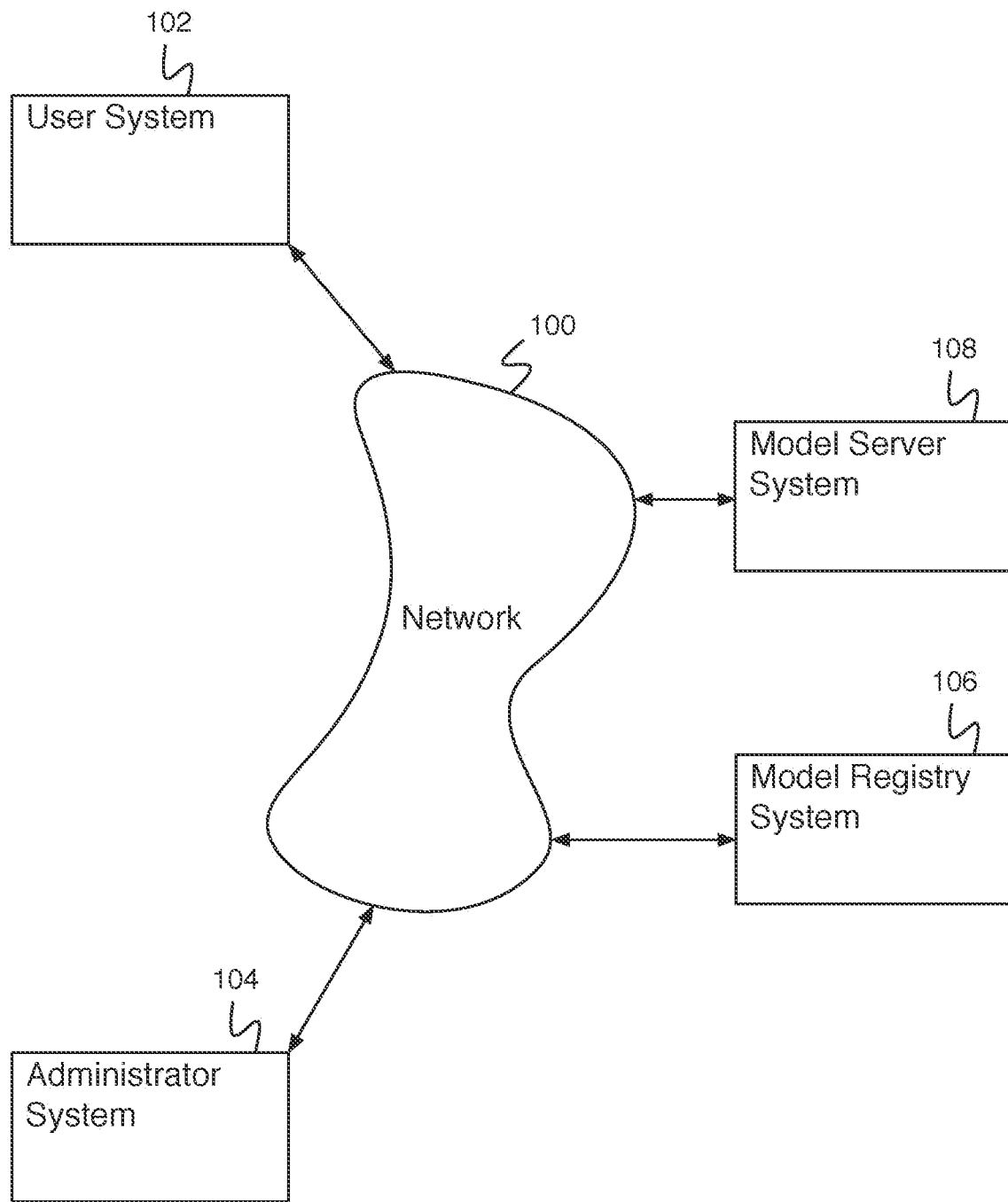
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for machine learning model registry and model serving is disclosed. The system comprises an interface, a processor, and a memory. The interface is configured to receive a version of a model from a model registry. The processor is configured to store the version of the model, start a process running the version of the model, and update a proxy with version information associated with the version of the model to generate an updated proxy, wherein the updated proxy indicates to redirect an indication to invoke the version of the model to the process. The memory is coupled to the processor and configured to provide the processor with instructions.

A system for a machine learning model registry and model serving comprises a machine learning model registry in communication with a machine learning model server. A machine learning engineer develops a version of a machine learning model, and when the model is ready for use, registers the machine learning model to the machine learning model registry. The machine learning (ML) model is associated with a model name, a model version, and optionally a model tag. For example, a model tag comprises a production tag or a staging tag, indicating that the model is a production model (e.g., the model has been tested and is ready for usage) or that the model is a staging model (e.g., the model is in good condition and is ready for full testing). An automated background process compares the set of models stored by the ML model registry and the ML model server, and in the event the process determines that they do not match, the process updates the model server to match the model registry. For example, if an ML model is found on the model registry that is not on the model server, the ML model is copied from the model registry to the model server. The server is updated to provide access to the model, including adding the model version information to a proxy (e.g., a proxy server redirect table) and starting a process on the model server running the version of the model. In the event the automated background process determines that a model tag is updated on the model registry, the model tag is updated accordingly on the model server. If an ML model is found on the model server that is not on the model registry, the ML model is removed from the model server.

The model server comprises a server node accessible via URL API requests provided via a network. In some embodiments, the model server comprises a virtual machine executing on a server node. The model server comprises a proxy server for receiving and directing URL API requests. Information for request routing is stored in a proxy (e.g., a proxy server redirect table) that is updated whenever a model or a tag on the model server is updated. The model server runs a process associated with each stored model. When the model server receives a request to run a model via a URL API request, the proxy server directs to a process according to information in the proxy (e.g., a proxy server redirect table). The process is provided access to data associated with the request, executes the ML model on the data, and provides the model result to the requester. The system for a machine learning model registry and model serving improves the computer by providing access to a machine learning model via an automatically maintained URL endpoint including a static production URL. A new model version can be provided for use with minimal manual configuration, allowing simple version updating with little chance of user error causing an incident.

FIG. 1 is a block diagram illustrating an embodiment of a network system. In some embodiments, the network system of FIG. 1 comprises a system for a machine learning model registry and model serving. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and database system 106 communicate via network 100.

User system 102 comprises a user system for use by a user. For example, user system 102 comprises a system for communication, data access, computation, etc. A user uses user system 102 to manage one or more machine learning models on model registry system 106—for example, to add a model, remove a model, modify a model, add a new version of a model, change a model tag, etc. Administrator system 104 comprises an administrator system for use by an administrator. For example, administrator system 104 comprises a system for communication, data access, computation, etc. An administrator uses administrator system 104 to maintain model registry system 106 and/or model server system 108. For example, an administrator uses administrator system 104 to start and/or stop services on database system 106 or model server system 108, to reboot database system 106 or model server system 108, to install software on database system 106 or model server system 108, to add, modify, and/or remove data on database system 106 or model server system 108, etc.

Model registry system 106 comprises a model registry system for storing ML models, training ML models, registering ML models for upload to model server system 108, storing model tags, etc. In various embodiments, model registry system 106 comprises a single computer, a plurality of computers, a cluster system, a plurality of virtual machines, etc. Model server system 108 comprises a server system for providing access to one or more ML models. Model server system 108 stays synchronized with ML models stored on model registry system 106 and registered for upload. For example, model server system 108 comprises an interface configured to receive a version of a model from a model registry, a processor configured to store the version of the model, start a process running the version of the model, and update a proxy (e.g., a proxy server redirect table) with version information associated with the version of the model to generate an updated proxy, wherein the updated proxy indicates to redirect an indication to invoke the version of the model to the process, and a memory coupled to the processor and configured to provide the processor with instructions.

Figure 2A:
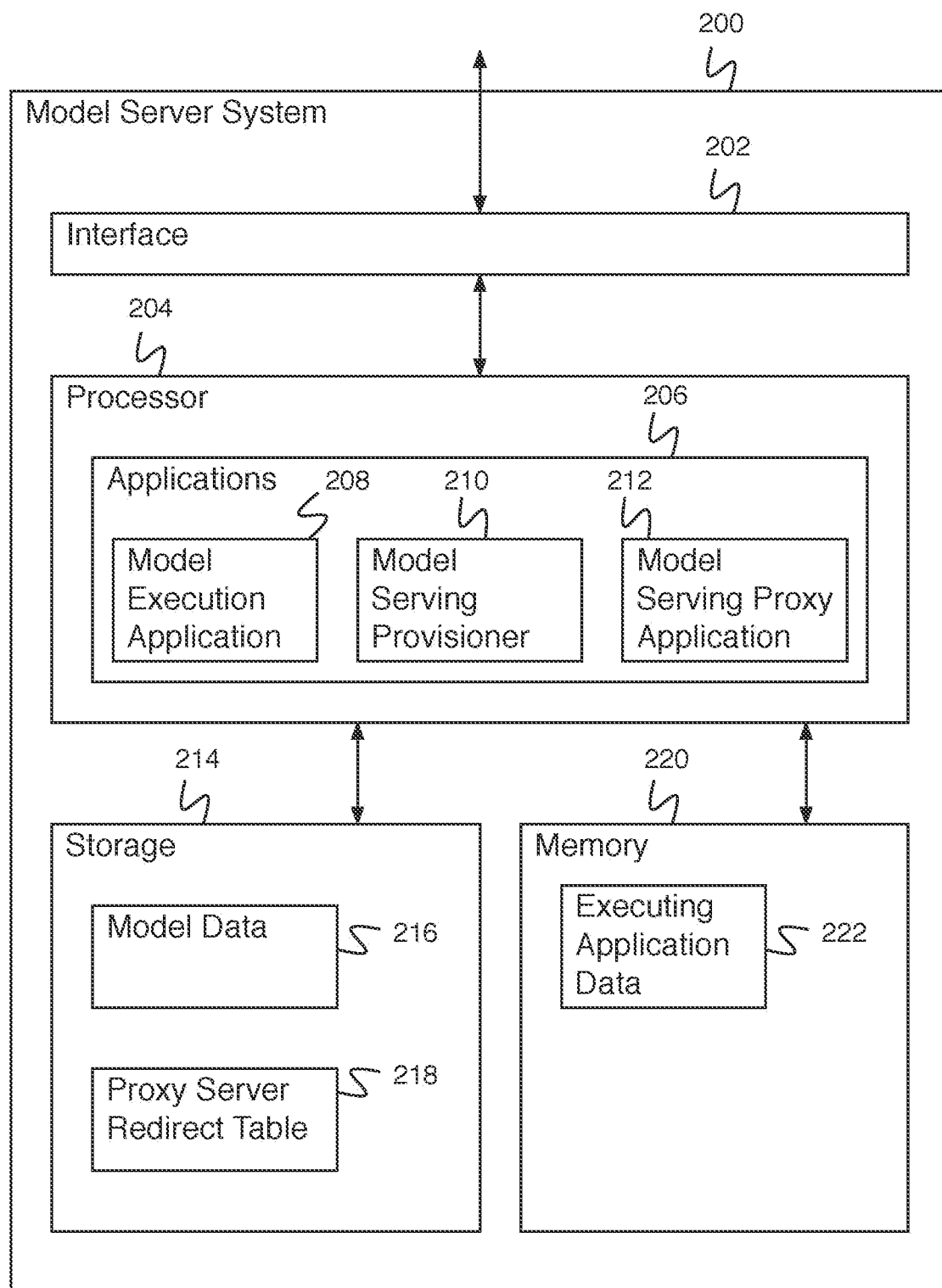
FIG. 2A is a block diagram illustrating an embodiment of a model server system.

FIG. 2A is a block diagram illustrating an embodiment of a model server system. In some embodiments, model server system 200 comprises model server system 108 of FIG. 1. In the example shown, model server system 200 comprises interface 202. For example, interface 202 comprises an interface for receiving data, providing data, receiving a request to delete or modify data, receiving a version of a model from a model registry, receiving an indication to update a version tag, receiving model data, receiving a request to execute a model, providing a model output, etc. Processor 204 comprises a processor for executing applications 206. Applications 206 comprises model execution application 208, model serving provisioner 210, and model serving proxy application 212. Model execution application 208 comprises an application for executing a model (e.g., an ML model) utilizing stored model data (e.g., model data 216). For example, model execution application 208 comprises one or more processes comprising ML models. Model serving provisioner 210 comprises a set of state machines for maintaining a cluster status. For example, model serving provisioner 210 launches or terminates clusters, starts and stops model server processes, and configures proxy or service discovery layers. Model serving proxy application 212 comprises a proxy server for receiving a request (e.g., a request via a URL endpoint) and directing the request. Model serving proxy application 212 directs a request according to proxy server redirect table 218. For example, the request is directed to a process comprising an ML model of model execution application 208. For example, processor 204 is configured to receive a version of a model, store the version of the model, start a process running the version of the model, and update a proxy server redirect table with version information associated with the version of the model to generate an updated proxy, wherein the updated proxy server redirect table indicates to redirect an indication to invoke the version of the model to the process. In some embodiments, applications 206 comprise any other appropriate applications (e.g., an index maintenance application, a communications application, a chat application, a web browser application, a document preparation application, a report preparation application, a user interface application, a data analysis application, etc.). Storage 214 comprises model data 216 (e.g., one or more stored ML model descriptions) and proxy server redirect table 218 (e.g., redirect information associating model processes with model requests, etc.). Memory 220 comprises executing application data 222 comprising data associated with applications 206.

Figure 2B:
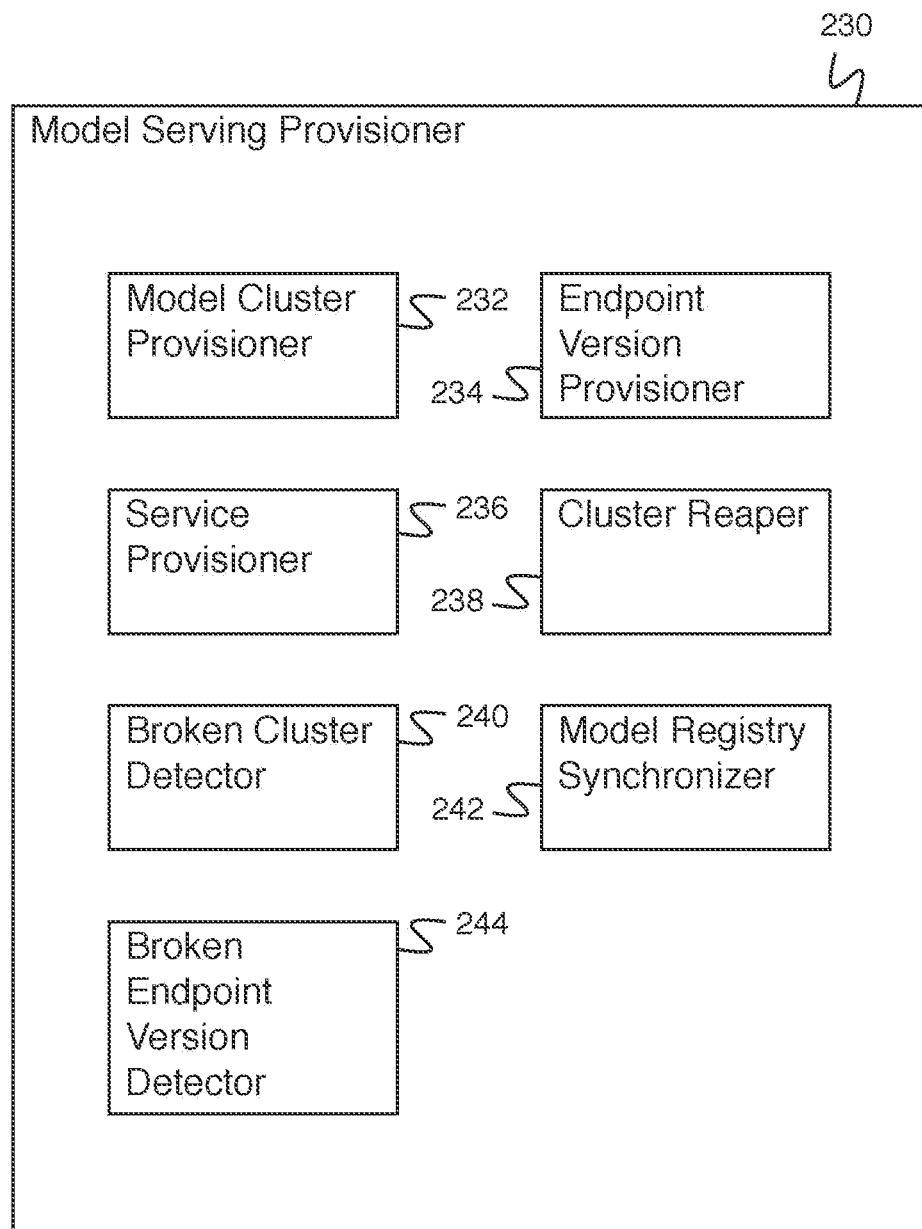
FIG. 2B is a block diagram illustrating an embodiment of a model serving provisioner.

FIG. 2B is a block diagram illustrating an embodiment of a model serving provisioner. In some embodiments, model serving provisioner 230 comprises model serving provisioner 210 of FIG. 2A. For example, model serving provisioner 230 comprises a set of state machines operating independently or in concert. In the example shown, model serving provisioner 230 comprises model cluster provisioner 232, endpoint version provisioner 234, service provisioner 236, cluster reaper 238, broken cluster detector 240, model registry synchronizer 242, and broken endpoint version detector 244. For example, model cluster provisioner 232 creates a cluster and initializes a virtual environment and proxy server on the cluster. Endpoint version provisioner 234 deploys servers on endpoints that are ready. Service provisioner 236 configures a proxy server. Cluster reaper 238 terminates clusters which were created on behalf of an endpoint but for which no endpoint exists. The process executed by cluster reaper 238 follows a mark-and-sweep process. For example, orphaned clusters are identified by a cluster tag indicating that the cluster comprises a model serving cluster but for which no endpoint exist, and marked for reaping. On the next reaper iteration, marked clusters that are still orphaned are terminated. In some embodiments, combining a fixed interval execution of cluster reaper 238 with the mark-and-sweep process produces a simple process that eliminates race conditions. Clusters that have been created but whose cluster ID has not been persisted to the database yet should not be terminated. Broken cluster detector 240 identifies clusters related to ready endpoints whose proxy servers are not responding to external health checks. For example, proxy servers not responding to external health checks comprise proxy servers that have been restarted or run out of memory. Broken clusters that have been identified have their endpoint set to pending and any versions in the launching or running state set to pending. As a result, the state of model cluster provisioner 232 for the cluster is reset and the state of endpoint version provisioner 234 for the cluster is reset. In some embodiments, in the event that a higher level process is terminating the cluster, this state machine process will continue to recreate the cluster. In some embodiments, resetting the state of endpoint version provisioner 234 for the cluster can create a race condition in the event that endpoint version provisioner 234 is in a non-terminal state. In the event that this race condition occurs it will be detected by broken endpoint version detector 244. Broken endpoint version detector 244 identifies endpoint versions in the ready state that fail to local requests to their ping endpoint, suggesting the process has failed. In the event a broken endpoint version is detected, the process is killed and the endpoint version status is set to pending, causing it to be restarted. Model registry synchronizer 242 accesses the latest versions on the model registry for enabling serving of all active versions of a model. Model registry synchronizer 242 will delete any endpoint versions not present in the latest versions and add any registered endpoint versions that are not served. Additionally model registry synchronizer 242 removes any aliases that are no longer associated with a model and add or update aliases that are associated with different endpoint versions than are stored in the serving database.

Figure 2C:
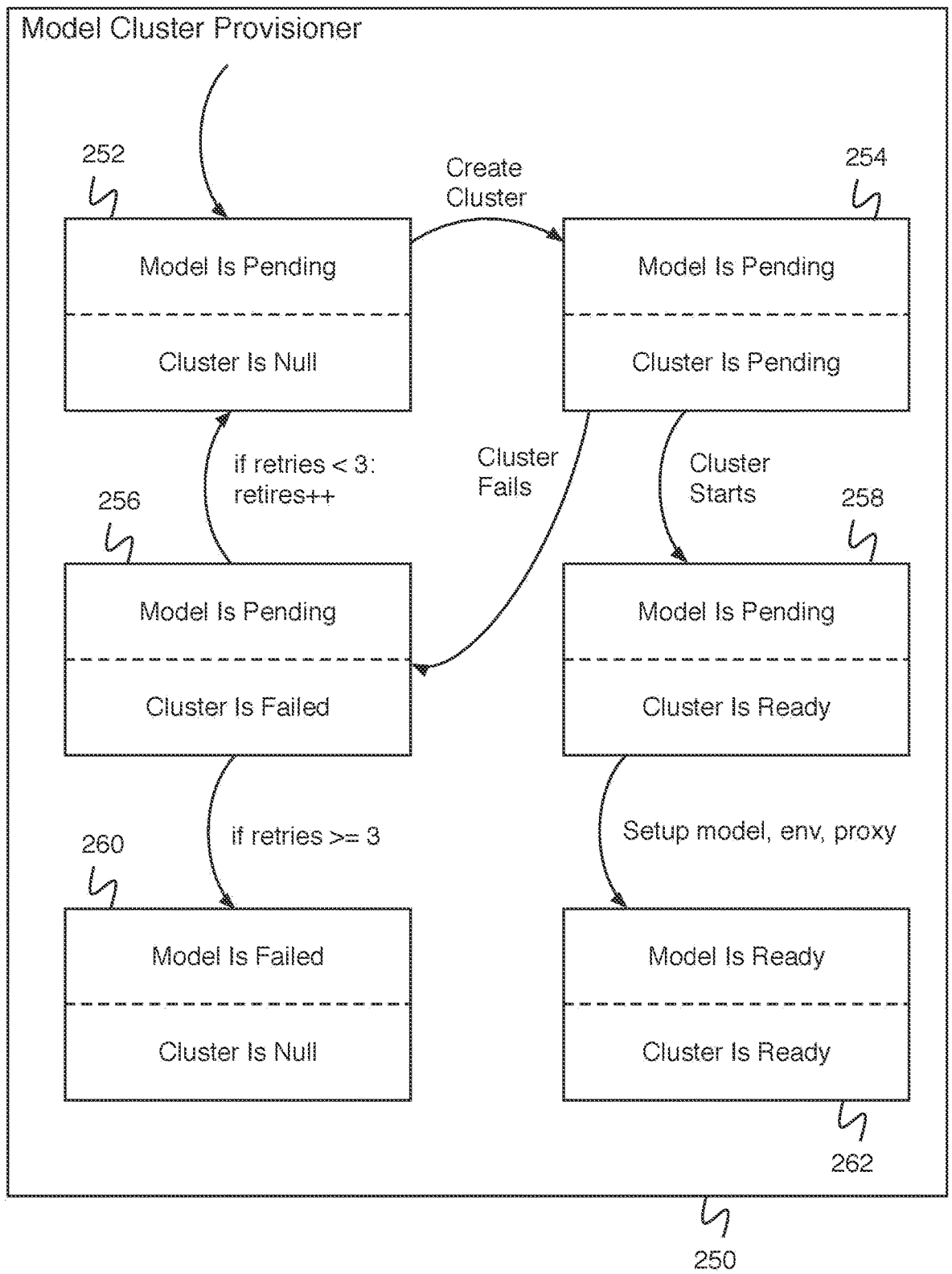
FIG. 2C is a state diagram illustrating an embodiment of a model cluster provisioner state machine.

FIG. 2C is a state diagram illustrating an embodiment of a model cluster provisioner state machine. In some embodiments, model cluster provisioner 250 comprises model cluster provisioner 232 of FIG. 2B. In the example shown, state 252 comprises an initial state. In state 252, the model is pending and the cluster is null. Upon a create cluster action, the state machine transitions to state 254. In state 254, the model is pending and the cluster is pending. In the event that the cluster fails, the state machine transitions to state 256. In state 256, the model is pending and the cluster is failed. In the event that a retries counter is less than N (e.g., where N is an integer such as 1, 2, 3, 4, 5, 10, etc.), the retries counter is incremented and the state machine transitions to state 252. From state 256, in the event that the retries counter is greater than or equal to N, the state machine transitions to state 260. In state 260, the model is failed and the cluster is null. For example, from state 260, the system must be reset or otherwise restarted. From state 254, in the event that the cluster starts, the state machine transitions to state 258. In state 258, the model is pending and the cluster is ready. The state machine then sets up a model process, an environment process, and a proxy server process. For example, the proxy server process comprises an nginx process. The state machine then transitions to state 262. In state 262, the model is ready and the cluster is ready.

Figure 2D:
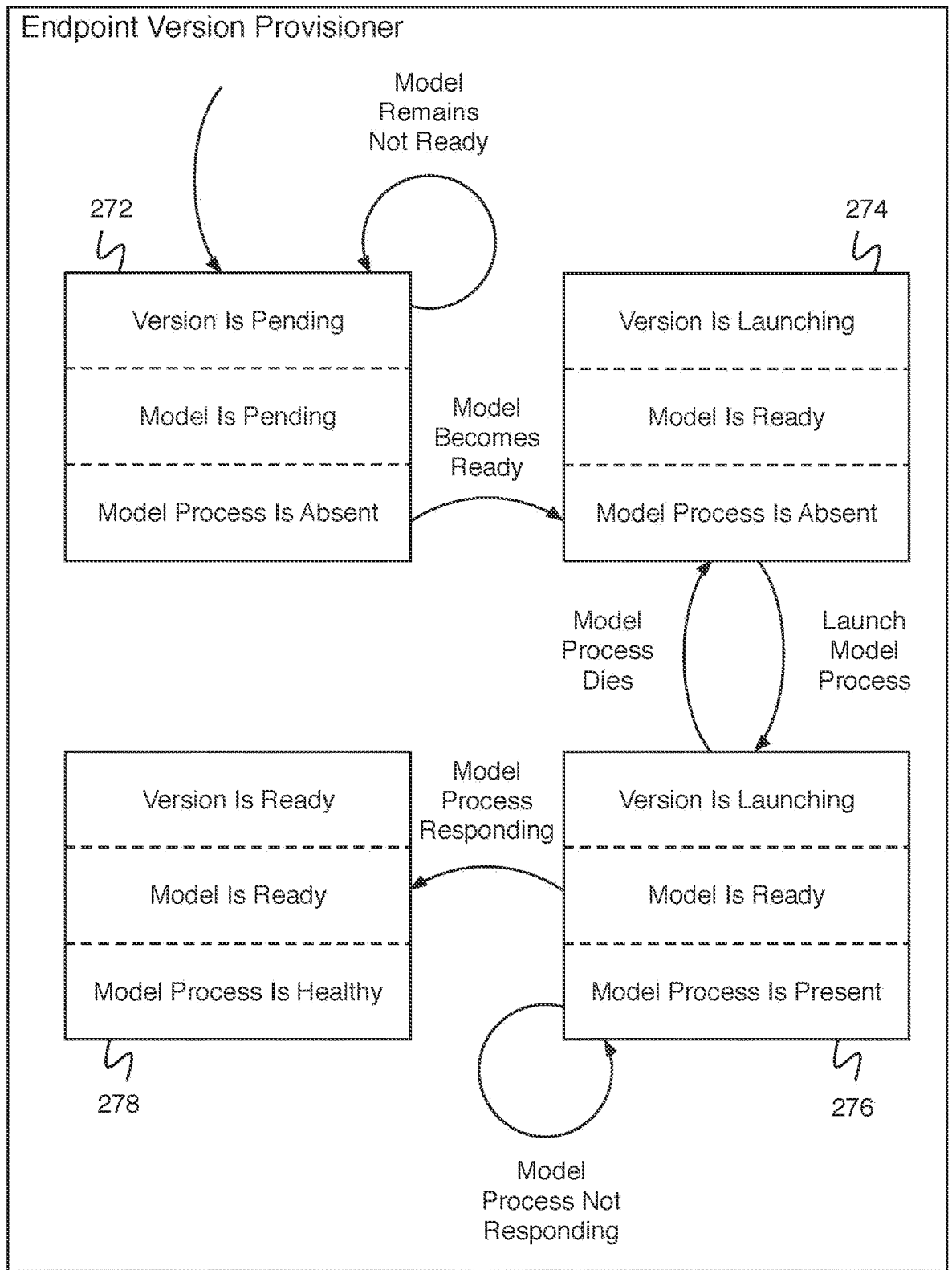
FIG. 2D is a state diagram illustrating an embodiment of an endpoint version provisioner state machine.

FIG. 2D is a state diagram illustrating an embodiment of an endpoint version provisioner state machine. In some embodiments, endpoint version provisioner state machine 270 comprises endpoint version provisioner 234 of FIG. 2B. In the example shown, state 272 comprises an initial state. In state 272, the version is pending, the model is pending, and the model process is absent. In the event that the model remains not ready, the state machine remains at state 272. For example, the model transitions to ready as part of the state diagram of model cluster provisioner 250 of FIG. 2C. In the event the model becomes ready, the state machine transitions to state 274. In state 274, the version is launching, the model is ready, and the model process is absent. From state 274, the model process is launched, and the state machine transitions to state 276. In state 276, the version is launching, the model is ready, and the model process is present. In the event the model process dies, the state machine transitions to state 274. In the event the model process is not responding, the state machine remains at state 276. In the event that the model process is responding, the state machine transitions to state 278. In state 278, the version is ready, the model is ready, and the model process is healthy.

Figure 2E:
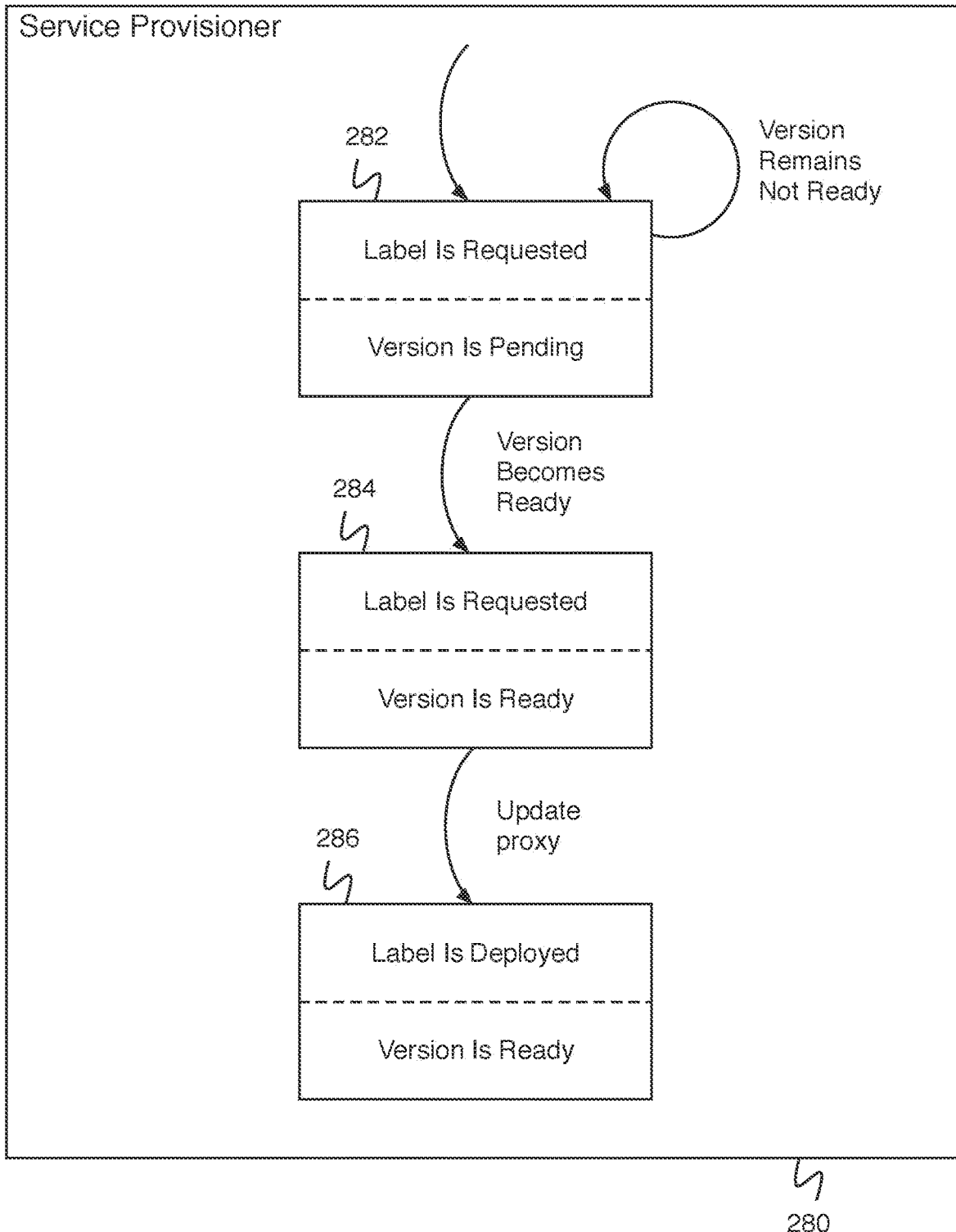
FIG. 2E is a state diagram illustrating an embodiment of a service provisioner state machine.

FIG. 2E is a state diagram illustrating an embodiment of a service provisioner state machine. In some embodiments, service provisioner state machine 280 comprises service provisioner 236 of FIG. 2B. In the example shown, state 282 comprises an initial state. In state 282, the label is requested and the version is pending. In the event that the version remains not ready, the state machine remains at state 282. For example, the version transitions to ready as part of the state diagram of endpoint version provisioner 270 of FIG. 2D. In the event the version becomes ready, the state transitions to state 284. In state 284, the label is requested and the version is ready. From state 284, the proxy is updated. For example, the proxy comprises an nginx process. The state machine transitions to state 286. In state 286, the label is deployed and the version is ready.

Figure 3:
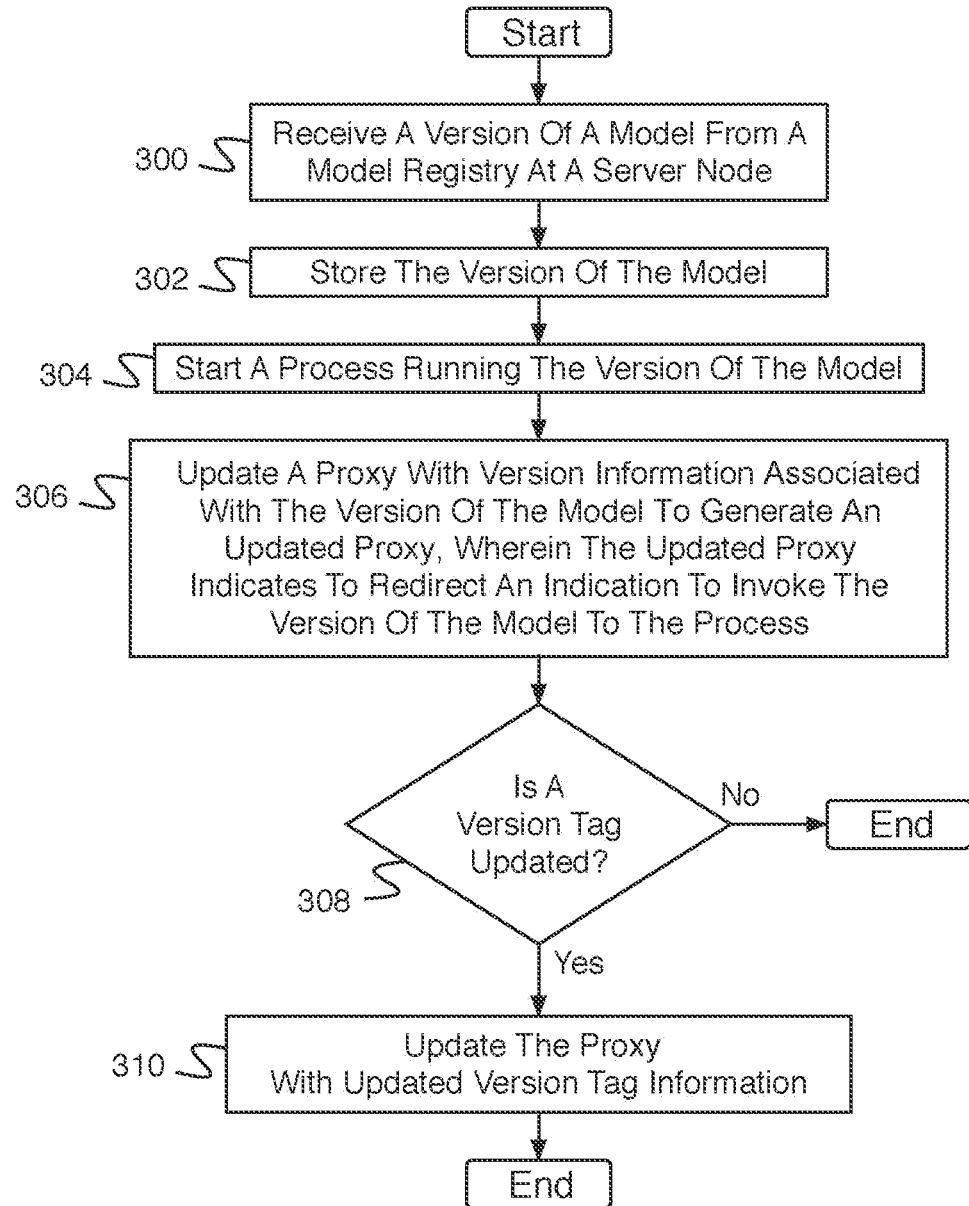
FIG. 3 is a flow diagram illustrating an embodiment of a process for a machine learning model registry and model serving.

FIG. 3 is a flow diagram illustrating an embodiment of a process for a machine learning model registry and model serving. In some embodiments, the process of FIG. 3 is executed by model server system 108 of FIG. 1. In the example shown, in 300, a version of a model is received from a model registry at a server node. In 302, the version of the model is stored. In 304, a process is started running the version of the model. In 306, a proxy is updated with version information associated with the version of the model to generate an updated proxy, wherein the updated proxy indicates to redirect an indication to invoke the version of the model to the process. For example, a proxy server redirect table is updated with version information associated with the version of the model, wherein the updated proxy server redirect table indicates to redirect an indication to invoke the version of the model to the process. In 308, it is determined whether a version tag is updated. In the event it is determined that the version tag is not updated, the process ends. In the event it is determined that the version tag is updated, control passes to 310. In 310, the proxy is updated with updated version tag information. For example, the proxy server redirect table is updated with updated version tag information.

Figure 4:
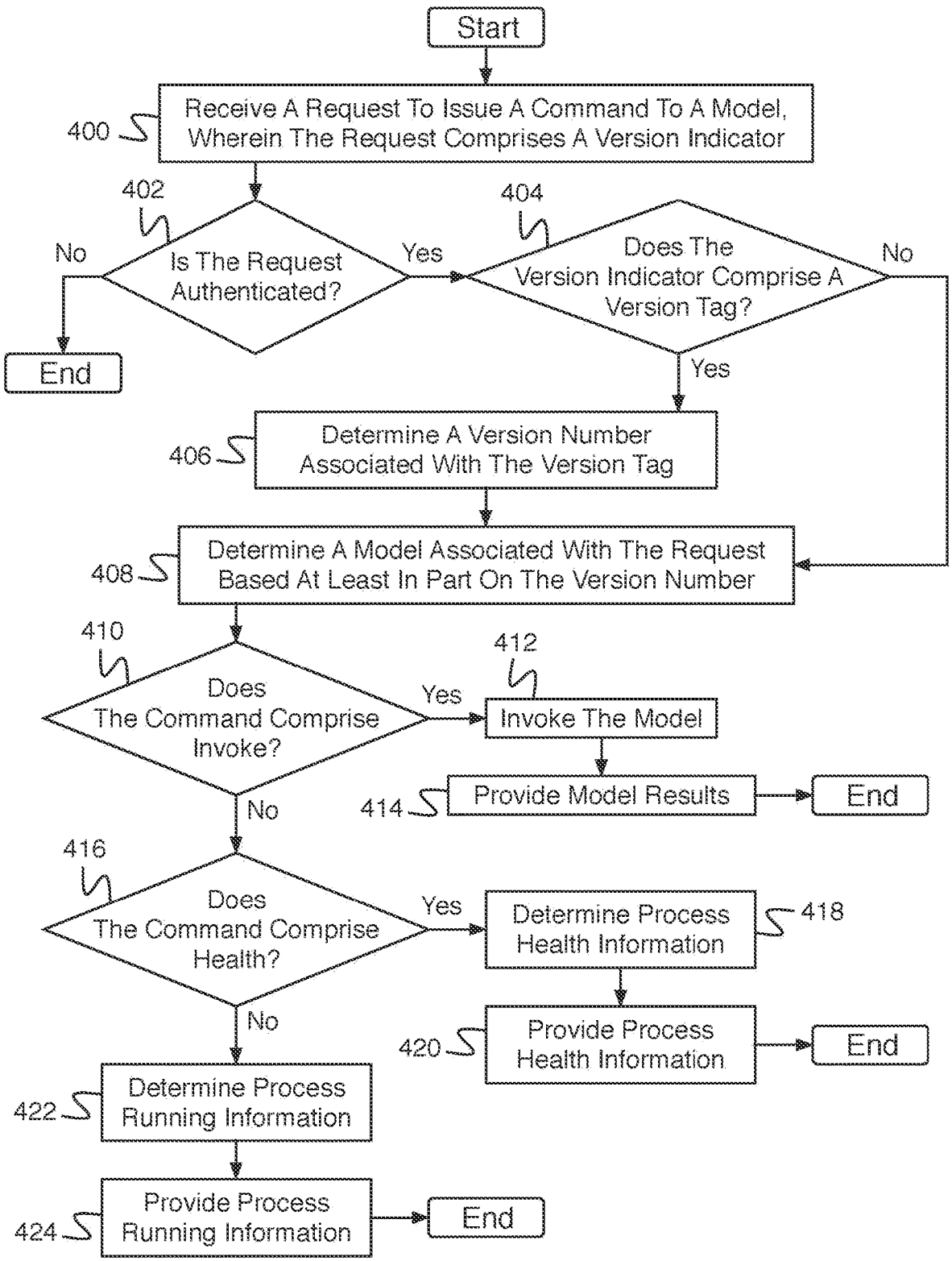
FIG. 4 is a flow diagram illustrating an embodiment of a process for issuing a command to a model.

FIG. 4 is a flow diagram illustrating an embodiment of a process for issuing a command to a model. In some embodiments, the process of FIG. 4 is executed by model server system 108 of FIG. 1. In the example shown, in 400, a request is received to issue a command to a model, wherein the request comprises a version indicator (e.g., comprising a version number or a version tag). For example, the command comprises an invoke command (e.g., a request to execute a model), a health command (e.g., a request to determine the health of a process associated with a model), or a ping command (e.g., a request to determine whether a process associated with a model is running). For example, the request comprises an indication that a URL endpoint has been accessed. The URL endpoint comprises a URL with a known address, wherein accessing the URL endpoint comprises issuing a command. For example, the URL endpoint comprises one or more of a domain, a model name, a model version, a version tag, a keyword indicating a request to execute, a keyword indicating a request to check process health, a keyword indicating a request to check process running, etc. In some embodiments, a request to execute a model is associated with execution data. In some embodiments, the request additionally comprises an authentication token or is associated with an authentication token. In 402, it is determined whether the request is authenticated. For example, determining whether the request is authenticated comprises receiving authentication information (e.g., an authentication token), attempting to authenticate the authentication information (e.g., by validating the authentication token, etc.), and determining whether the authentication information is successfully validated. In the event the request is not authenticated, the process ends. In the event the request is authenticated, control passes to 404. In 404, it is determined whether the version indicator comprises a version tag. For example, a version tag comprises a production version tag or a staging version tag. In the event that the version indicator does not comprise a version tag (e.g., the version indicator comprises a version number), control passes to 408. In the event that the version indicator comprises a version tag, control passes to 406. In 406, a version number associated with the version tag is determined. In 408, a model associated with the request is determined based at least in part on the version number. In some embodiments, a process for executing the model is determined. For example, the process for executing the model is determined by querying a proxy (e.g., looking in a proxy server redirect table) using a model name and version indicator. In 410, it is determined whether the command comprises invoke. In the event it is determined that the command comprises invoke, control passes to 412. In 412, the model is invoked. For example, the process comprising the model is instructed to execute the model on a set of input data. In 414, model results are provided, and the process ends. In the event it is determined in 410 that the command does not comprise invoke, control passes to 416. In 416, it is determined whether the command comprises health. In the event it is determined that the command comprises health, control passes to 418. In 418, process health information is determined. For example, process health information is determined by querying the process, by querying the operating system, etc. In 420, process health information is provided, and the process ends. In the event it is determined in 416 that the command does not comprise health (e.g., in the event that the command neither comprises invoke nor health, the command comprises ping), control passes to 422. In 422, process running information is determined. For example, process running information is determined by querying the operating system to determine whether the process is running. In some embodiments, in the event it is determined that the process is not running, the process is restarted. In 424, process running information is provided.

Figure 5:
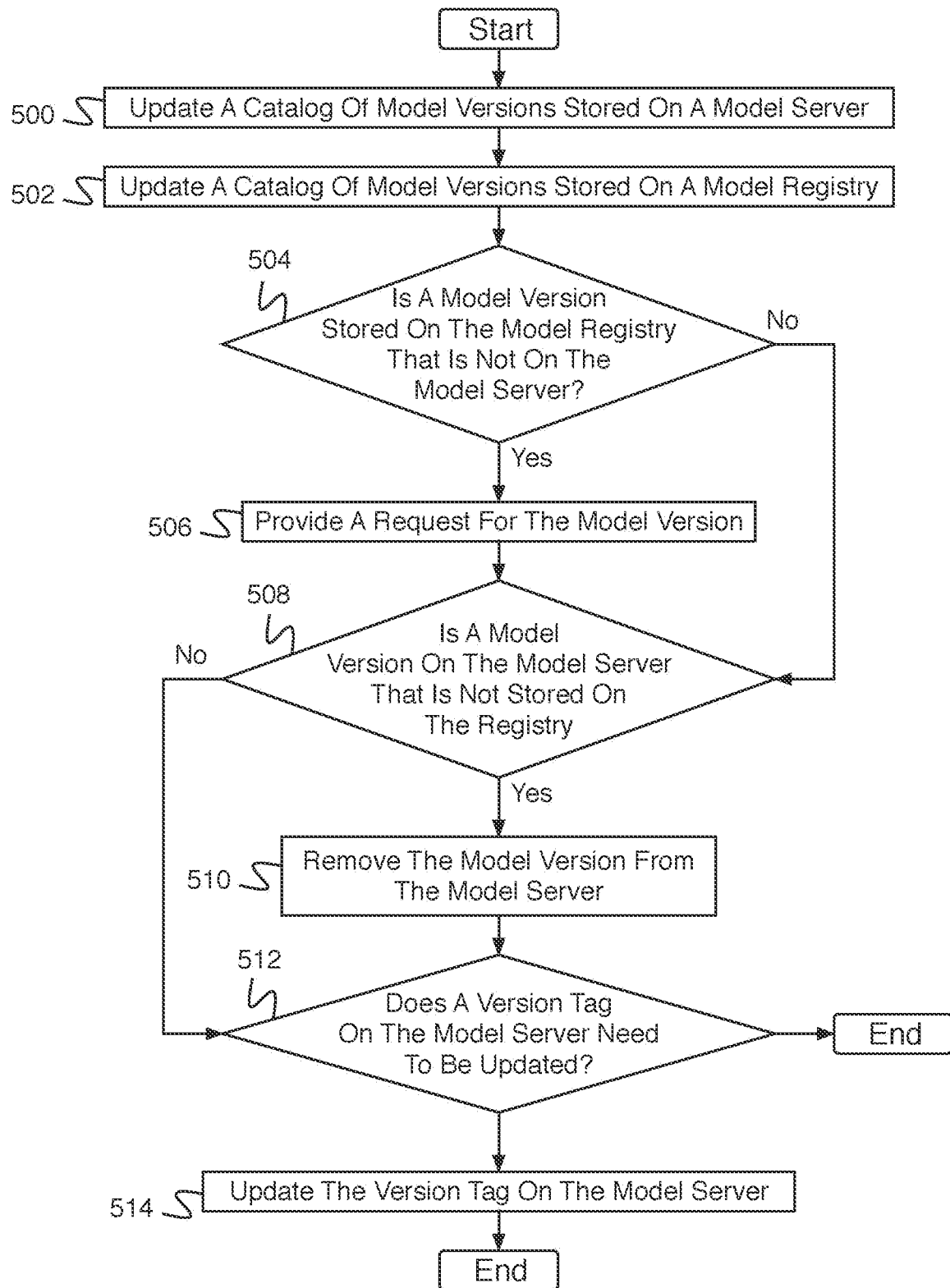
FIG. 5 is a flow diagram illustrating an embodiment of a process for synchronizing a model server system and a model registry system.

FIG. 5 is a flow diagram illustrating an embodiment of a process for synchronizing a model server system (e.g., model server system 108 of FIG. 1) and a model registry system (e.g., model registry system 106 of FIG. 1). For example, the process of FIG. 5 is executed by the model server system. In some embodiments, synchronizing a model server system comprises updating stored models and versions.

In the example shown, in 500, a catalog of model versions stored on the model server is updated. For example, the model server comprises a server node or a model serving virtual machine. For example, updating a catalog of model versions stored on the model server comprises querying a set of models and versions at the model server. In 502, a catalog of model versions stored on a model registry is updated. For example, updating a catalog of model versions stored on the model registry comprises querying a set of models and versions at the model registry. In 504, it is determined whether a model version is stored on the model registry that is not on the model server. In the event it is determined that there is not a model version stored on the model registry that is not on the model server, control passes to 508. In the event it is determined that there is a model version stored on the model registry that is not on the model server, control passes to 506. In 506, the process provides a request for the model version. In 508, it is determined whether a model version is on the model server that is not stored on the registry. In the event it is determined that there is not a model version on the model server that is not stored on the registry, control passes to 512. In the event it is determined that there is a model version on the model server that is not stored on the registry, control passes to 510. In 510, the model version is removed from the model server. In 512, it is determined whether a version tag on the model server needs to be updated. For example, a version tag on the model server needs to be updated in the event that a version tag on the model server does not match a version tag on the model registry. In the event it is determined that a version tag on the model server does not need to be updated, the process ends. In the event it is determined that a version tag on the model server needs to be updated, control passes to 514. In 514, a version tag on the model server is updated (e.g., to match the version tag on the model registry).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, by a model server system, an application programming interface (API) request to execute a machine learning model hosted by the model server system, the API request including execution data and a version indicator identifying a first version of the machine learning model to execute the API request, wherein the model server system hosts at least two different versions of the machine learning model and the API request was initiated by an application executing on a client device that is remote to the model server system;
identifying the first version of the machine learning model based on the version indicator included in the API request;
generating an input based on the execution data included in the API request;
generating an output by providing the input to the first version of the machine learning model; and
providing, to the client device, a response to the API request, the response having been generated based on the output.

2. The method of claim 1, wherein the application is a chat application.

3. The method of claim 1, further comprising:
receiving, by the model server system, a subsequent API request to execute the machine learning model, the subsequent API request including a version indicator identifying a second version of the machine learning model, the second version of the machine learning model being different than the first version of the machine learning model;
identifying the second version of the machine learning model based on the version indicator included in the subsequent API request;
generating a subsequent input based on execution data included in the subsequent API request;
generating a subsequent output by providing the subsequent input to the second version of the machine learning model; and
providing a response to the subsequent API request, the response to the subsequent API request having been generated based on the subsequent output.

4. The method of claim 1, wherein identifying the first version of the machine learning model based on the version indicator included in the API request comprises:
querying a proxy server redirect table based on the version indicator included in the API request to determine routing information for the first version of the machine learning model.

5. The method of claim 4, wherein providing the input to the first version of the machine learning model comprises routing the input to an endpoint based on the routing information for the first version of the machine learning model.

6. The method of claim 1, wherein the API request further includes an authentication token.

7. The method of claim 6, further comprising:
authenticating the API request based on the authentication token.

8. A computer system comprising:
one or more computer processors; and
one or more computer-readable mediums storing instruction that, when executed by the one or more computer processors, cause the computer system to perform operations comprising:
receiving an application programming interface (API) request to execute a machine learning model hosted by the model server system, the API request including execution data and a version indicator identifying a first version of the machine learning model to execute the API request, wherein the model server system hosts at least two different versions of the machine learning model and the API request was initiated by an application executing on a client device that is remote to the model server system;
identifying the first version of the machine learning model based on the version indicator included in the API request;
generating an input based on the execution data included in the API request;
generating an output by providing the input to the first version of the machine learning model; and
providing, to the client device, a response to the API request, the response having been generated based on the output.

9. The computer system of claim 8, wherein the application is a chat application.

10. The computer system of claim 8, wherein the operations further comprise:
receiving a subsequent API request to execute the machine learning model, the subsequent API request including a version indicator identifying a second version of the machine learning model, the second version of the machine learning model being different than the first version of the machine learning model;
identifying the second version of the machine learning model based on the version indicator included in the subsequent API request;
generating a subsequent input based on execution data included in the subsequent API request;
generating a subsequent output by providing the subsequent input to the second version of the machine learning model; and
providing a response to the subsequent API request, the response to the subsequent API request having been generated based on the subsequent output.

11. The computer system of claim 8, wherein identifying the first version of the machine learning model based on the version indicator included in the API request comprises:
querying a proxy server redirect table based on the version indicator included in the API request to determine routing information for the first version of the machine learning model.

12. The computer system of claim 11, wherein providing the input to the first version of the machine learning model comprises routing the input to an endpoint based on the routing information for the first version of the machine learning model.

13. The computer system of claim 8, wherein the API request further includes an authentication token.

14. The computer system of claim 13, wherein the operations further comprise:
authenticating the API request based on the authentication token.

15. A non-transitory computer-readable medium storing instructions that, when executed by one or more computer processors of a computer system, cause the computer system to perform operations comprising:
receiving an application programming interface (API) request to execute a machine learning model hosted by the model server system, the API request including execution data and a version indicator identifying a first version of the machine learning model to execute the API request, wherein the model server system hosts at least two different versions of the machine learning model and the API request was initiated by an application executing on a client device that is remote to the model server system;
identifying the first version of the machine learning model based on the version indicator included in the API request;

generating an input based on the execution data included in the API request;

generating an output by providing the input to the first version of the machine learning model; and providing, to the client device, a response to the API request, the response having been generated based on the output.

16. The non-transitory computer-readable medium of claim 15, wherein the application is a chat application.

17. The non-transitory computer-readable medium of claim 15, wherein the operations further comprise:

receiving a subsequent API request to execute the machine learning model, the subsequent API request including a version indicator identifying a second version of the machine learning model, the second version of the machine learning model being different than the first version of the machine learning model;

identifying the second version of the machine learning model based on the version indicator included in the subsequent API request;

generating a subsequent input based on execution data included in the subsequent API request;

generating a subsequent output by providing the subsequent input to the second version of the machine learning model; and providing a response to the subsequent API request, the response to the subsequent API request having been generated based on the subsequent output.

18. The non-transitory computer-readable medium of claim 15, wherein identifying the first version of the machine learning model based on the version indicator included in the API request comprises:

querying a proxy server redirect table based on the version indicator included in the API request to determine routing information for the first version of the machine learning model.

19. The non-transitory computer-readable medium of claim 18, wherein providing the input to the first version of the machine learning model comprises routing the input to an endpoint based on the routing information for the first version of the machine learning model.

20. The non-transitory computer-readable medium of claim 15, wherein the operations further comprise:

authenticating the API request based on an authentication token included in the API request.

* * * * *